(No Model.) 2 Sheets—Sheet 2.

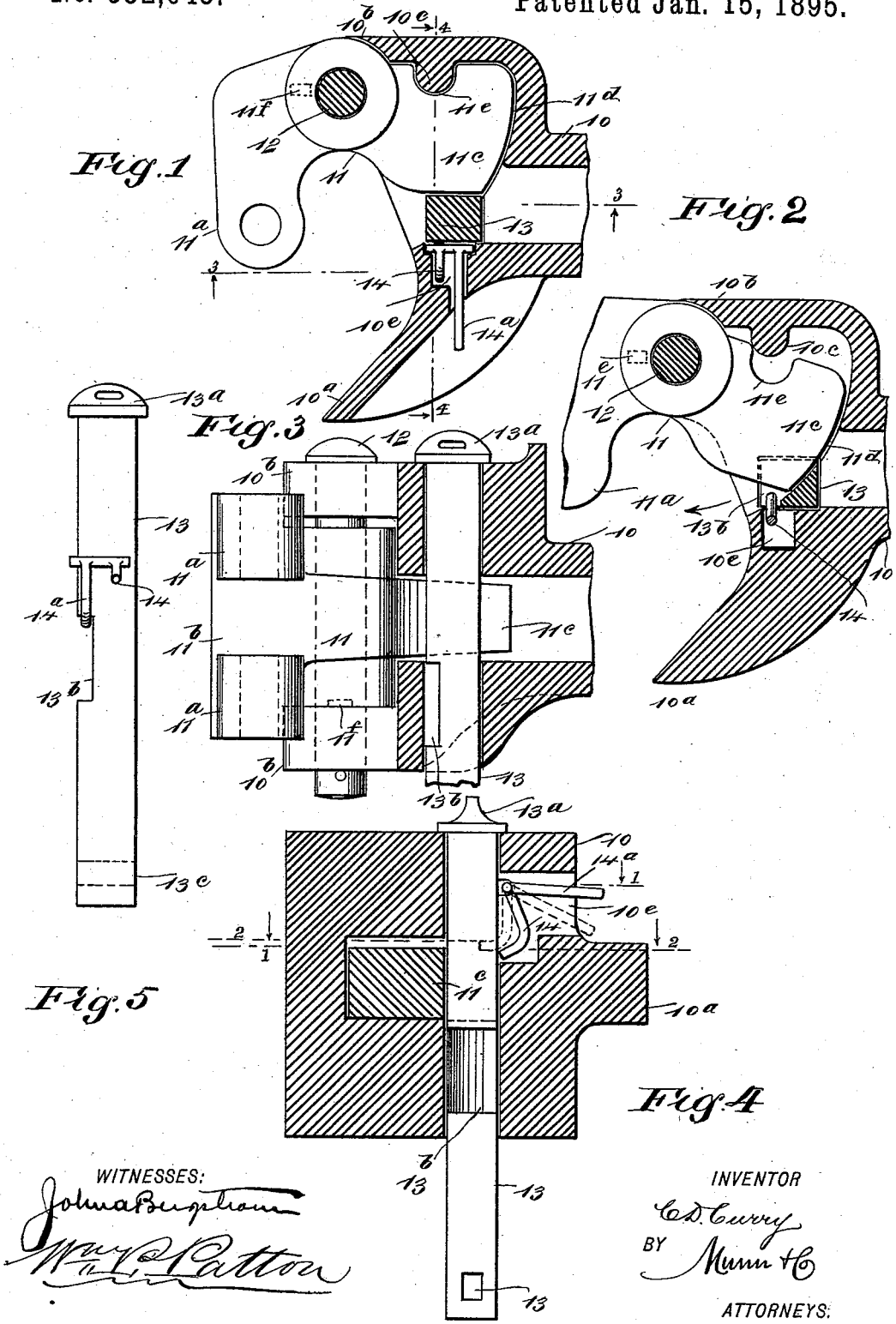

C. D. CURRY.
CAR COUPLING.

No. 532,643. Patented Jan. 15, 1895.

WITNESSES:
Joshua Bengtson
Wm. C. Patton

INVENTOR
C. D. Curry
BY
Munn & Co
ATTORNEYS.

UNITED STATES PATENT OFFICE.

CHARLES D. CURRY, OF DENISON, TEXAS.

CAR-COUPLING.

SPECIFICATION forming part of Letters Patent No. 532,643, dated January 15, 1895.

Application filed June 13, 1894. Serial No. 514,424. (No model.)

*To all whom it may concern:*

Be it known that I, CHARLES D. CURRY, of Denison, in the county of Grayson and State of Texas, have invented certain new and useful Improvements in Car-Couplings, of which the following is a full, clear, and exact description.

My invention relates to improvements in car couplings of the side latching or Janney type, and which are adapted for release from the sides of cars coupled with such couplings.

The objects of my invention are, to provide a simple, practical and reliable car coupling of the type indicated, which will be adapted for automatic connection in pairs, when two cars having the improvements are brought together on the same track, which will be capable of a ready release from the side of either coupled car, and also that will be adapted by its peculiar formation to receive support from one part of the improvements, when a coupled drawhead is partly detached from its connections to the car, and which if not so sustained might fall on the track, derail the car having the disabled coupling, and occasion the wreckage of said car and others of a train.

To these ends my invention consists in the construction and combination of parts, as is hereinafter described and claimed.

Reference is to be had to the accompanying drawings, forming a part of this specification, in which similar figures of reference indicate corresponding parts in all the views shown.

Figure 6:
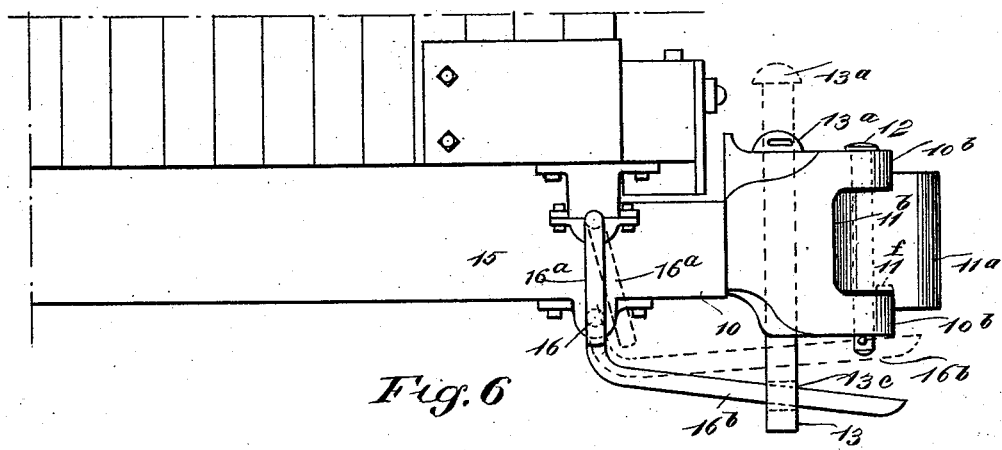
Figure 7:
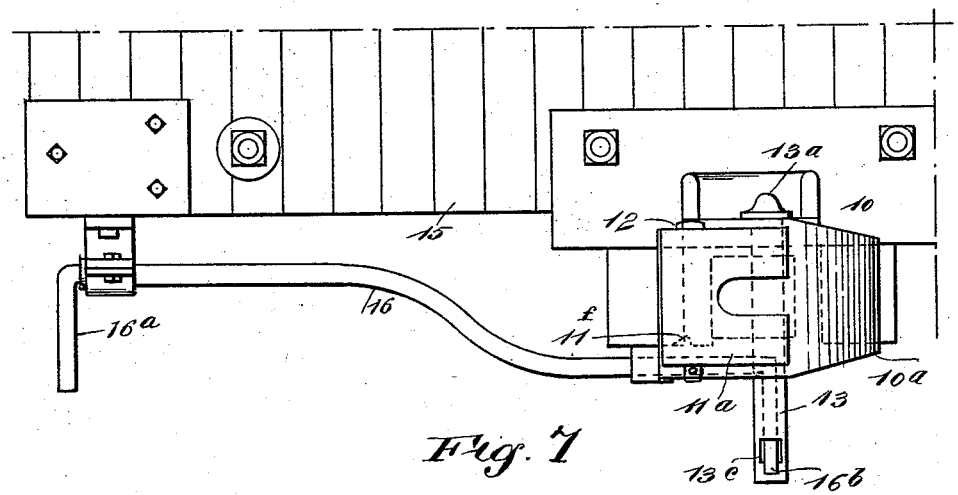
Figure 8:
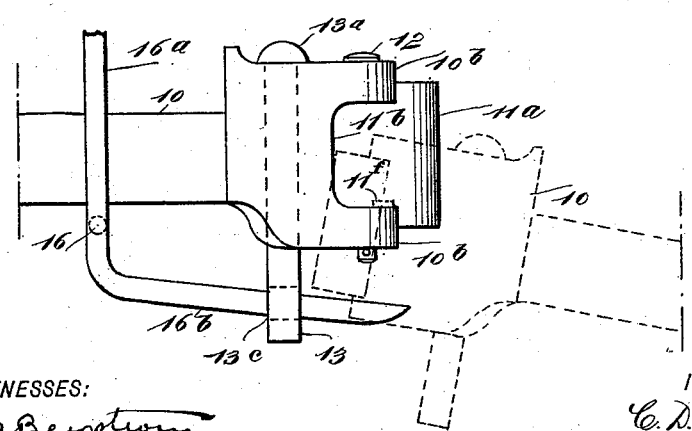

Figure 1 is a sectional plan view of the forward portion of a drawhead having part of the improvements, taken on the line 1—1 in Fig. 4. Fig. 2 is a sectional plan view of the parts shown in Fig. 1, on the line 2—2 in Fig. 4, indicating a different adjustment of the same. Fig. 3 is a sectional side view of the front portion of the coupling, on the line 3—3 in Fig. 1. Fig. 4 is a transverse sectional view of parts shown in Figs. 1 and 2, on the line 4—4 in Fig. 1. Fig. 5 is a detached side view of the improved locking pin. Fig. 6 is a side view of the completed coupling on a car in part. Fig. 7 is an end view of a car in part, and the improvements on the same; and Fig. 8 is a diagrammatic side view of the improved coupling devices, showing by dotted lines the release of the drawhead from the device provided to uncouple said drawhead, when the latter named part is torn loose from the car by accident or from other causes.

The drawhead 10 is cast into form as is usual in the construction of this part of a car coupling of the Janney type, and at the rear end portion (not shown) is constructed and sustained in the ordinary approved manner, to adapt it to receive limited longitudinal spring-cushioned movement on the car frame for the absorption of shocks incidental to its service, and as this is not a feature of the invention, the manner of connecting the car coupling with the car is omitted from the drawings.

The forward end portion of the drawhead 10 is widened and interiorly recessed to produce two parallel top and bottom walls, that extend a proper distance rearwardly and are incurved at the front edges, thereby producing a solid horn $10^a$ at one side of the front of the drawhead, and two ears $10^b$ at the opposite side of the same, said ears being sufficiently spaced apart to receive between them the body of the substantially L-shaped latch block 11. See Figs. 1, 3, and 6. The latch block has its forward member $11^a$ horizontally slotted at the center of thickness as indicated in Figs. 3, 6, and 8 at $11^b$, to receive an ordinary elongated coupling link, when it is desired to couple a common coupling of the link and pin type with the improved car coupling, and said latch block 11 is pivoted to the drawhead by a detachable pivot bolt 12. As represented, the tail piece $11^c$ of the latch block has one edge $11^d$ shaped and rearwardly extended at such an angle from the knuckle joint the block forms with the drawhead at its pivot bolt, that said edge will have contact throughout its extent with the inner surface of the side wall of the recess it approaches, when the other limb $11^a$ of the latch block is extended partly across the front of the drawhead to form a latched connection with a like member on a similar coupling.

At $11^e$ there is a suitably shaped notch produced in the nearly straight edge of the tail piece $11^c$ which is adapted to receive the corresponding lug $10^c$ formed on the side wall of the drawhead as shown in Fig. 1, this interlocking connection of the lug with the tail piece serving to reinforce the pivot bolt of the knuckle joint, and relieve said joint from draft strain, when the drawhead and latch block are in coupled engagement with another coupling, this construction of parts being one feature of the invention.

The body of the drawhead that projects rearwardly from the recessed and widened front portion is cored out to lighten it, and along the side wall of said longitudinal chamber of the part 10 that is nearest to the horn 10$^a$, a rectangular vertical aperture is formed through the top and bottom walls of the recessed part of the drawhead for the free insertion of a locking pin 13, the latter being shaped to loosely fit the rectangular aperture it occupies.

The rear wall of the recess in the drawhead, is curved from its side wall that has the vertical lug 10$^c$ on it toward the vertical aperture which receives the pin 13, said concave wall having its radial center in the axis of the pivot bolt 12, and the rearward edge of the tail piece on the latch block 11 is convex curved to conform with said rear wall, as indicated in Figs. 1 and 2.

The edge of the tail piece 11$^c$ that is opposite the notched edge of the same is made parallel with the latter, and the breadth of said part 11$^c$ is so proportioned, that when the latch block is adjusted as shown in Fig. 1 the edge of the tail piece that is nearest to the pin-holding aperture, lies parallel with and close to the side wall of the locking pin, so that the latch block limb 11$^a$ will be retained by the locking pin in a locked condition, projected transversely of the front end of the drawhead.

At a suitable distance from the enlarged head 13$^a$ of the pin 13, a triangular portion of the body of said rectangular pin is removed so as to afford a passage for the rear edge portion of the tail piece 11$^c$, said open recess 13$^b$ being of such a vertical extent, as will adapt its top and bottom edges to conform with the top and bottom walls of the recess of the drawhead, when the locking pin is elevated a proper degree to effect such an alignment of parts. The pin 13 in a locked condition rests its head on the top of the drawhead, its recess 13$^b$ being then located below the drawhead recess, as represented in Figs. 3 and 5, a considerable portion of the coupling pin projecting below the drawhead when the latch block is locked with the pin, as shown in the figures mentioned.

In a portion of the drawhead from which the solid horn 10$^a$ extends outwardly and forwardly, a channel or groove 10$^e$ is produced, which is a lateral extension from the side of the vertical pin-receiving aperture before mentioned, this channel being provided to receive the detent hook piece 14, that is pivoted to hang in the channel and have the free end of its hook pressed against the adjacent side of the pin 13 when the latter is depressed, such a contact of the hook piece being enforced by a laterally projecting arm 14$^a$ that extends into the channel and by its weight tends to hold the free end of the hook in close contact with the pin.

The recess 13$^b$ in the pin 13 being cut so that it will remove both of the forward corners of the pin mentioned, it will be noticed in Fig. 2 that when the locking pin is elevated so as to bring said recess 13$^b$ opposite the tail piece 11$^c$, and the latter be thus permitted to traverse the recess 13$^b$ and release the latch block from an engagement with the locking pin, this adjustment of the latter will allow the free end of the detent hook 14, to enter the recess 13$^b$. The length of the toe on the detent hook piece 14 is so proportioned that its free extremity will lie across the path of the tail piece 11$^c$, which when forwardly rocked will impinge this end of the hook piece and push it out of the recess in the pin body.

On the car body such as 15, a rock shaft 16 is hung and journaled, so that its body will be supported to rock below the car frame and have one end portion whereon the right angle formed arm 16$^a$ is formed or secured, located at the side of the car body in a convenient position for the safe manipulation of the shaft by an operator at such side of the car. The rock shaft 16 extends across toward the drawhead 10 and has this portion of its body forwardly bent to produce a lifting limb 16$^b$ on it, which limb loosely engages the transverse slot 13$^c$ that is produced in the lower portion of the pin 13, near its lower terminal.

It will be seen that by a vibration of the arm 16$^a$ which is normally pendent, the locking pin 13 will be elevated, the relative position given to the cross slot in said pin being such as will locate the recess 13$^b$ opposite the tail piece 11$^c$, when the limb 16$^b$ impinges the lower surface of the drawhead, so that an assured release of the latch block 11 will result when the shaft 16 is rocked by a manipulation of its arm 16$^a$, as described.

From the relative location and pivotal support of the detent hook piece 14, its free extremity will afford support for the coupling pin 13 when said pin is elevated, either by directly lifting it or by the use of the rock shaft 16, as has been explained, the engagement of the toe of the detent hook with the upper terminal shoulder on the recess 13$^b$ of the coupling pin, serving to maintain said pin in elevated adjustment when this is desired.

In order to loosely retain the latch block 11, in open adjustment or outwardly swung so as to be in proper position for the impinge of a similar block on an approaching coupling, an inclined swell 11$^f$ is formed on the inner surface of the lower ear 10$^b$ of the drawhead, and a socket or mating recess is produced in the latch block 11, to receive said swell, the relative positions of the swell and recess being such as will adapt them to engage when the latch block is swung open. This will retain the block from accidentally swinging closed, but allow it to be moved by another latch block, a sufficient play being allowed at the pivot joint to permit such a locking and release to be effected.

In operation, the coupling pin on one of two couplings embodying the improvements is held elevated by the described means, and its latch block outwardly swung, while the latch block on the approaching similar car coupling is in a locked condition. It will be apparent that the impinge of the rounded terminal of the latch block member 11ª on the forward edge of the tail piece 11ᶜ will rock the latch block so that the rearward movement of its tail piece, will first disengage the detent hook piece 14, and then release the locking pin which has been sustained by an engagement of its upper shoulder with the top surface of the rear convex edge of the part 11ᶜ, and when the tail piece has been sufficiently swung to impinge its notched edge on the wall of the drawhead having the lug on it, the pin 13 will drop by its gravity and part of the weight of the limb 16ᵇ added thereto, so as to automatically couple the cars having the improvement. The jaws on the furcated coupling limb of the latch block 11, are vertically perforated for the reception of a common cylindrical coupling pin, after an ordinary elongated coupling link has been entered into the horizontal slot of the latch block, so that if it becomes necessary, the locked latch block on one of the improved car couplings, may be readily coupled with a common car coupling of the link and pin type. By the provision of the elongated lifting limb 16ᵇ that is forwardly extended from the rock shaft 16 to have a loose engagement with the transverse slot in the locking pin 13, it will be seen that the limb will uphold a partly loosened drawhead and prevent it from dropping, if its fastening to the car is not completely broken; and if the drawhead is entirely detached and coupled to another car coupling, draft strain from the latter will pull the loose car coupling clear from the limb of the rock shaft 16 as is shown by dotted lines in Fig. 8, without injury to said shaft.

Having thus fully described my invention, I claim as new and desire to secure by Letters Patent—

1. The combination, with a recessed drawhead, and a latch block pivoted therein, of a vertically slidable locking pin, having a recess in its side, and a rocking detent hook adapted to interlock with said recess in the pin, and releasable by the rocking movement of the latch block, substantially as described.

2. The combination, with a recessed drawhead that is channeled on one side, and a latch block pivoted in the recess, of a vertically slidable locking pin recessed in its side, and a detent hook having a lateral arm, which hook and arm are adapted to rock in the channel to engage said hook with the recess in the pin, substantially as described.

3. The combination, with a recessed drawhead, a substantially L-shaped latch block, and a pivot bolt for said block, of a locking pin rectangular in cross section, recessed on the side toward the latch block to clear the curved edge of the tail piece of the latch block when said pin is elevated, a detent hook piece having a laterally-extending arm and pivoted in a recess of the drawhead which hook piece is adapted by the weight of its arm to interlock with a shoulder of the pin recess when said pin is raised, and a rocking arm having a limb passing loosely through a hole in the pin near its lower end to elevate the pin from the side of a car, substantially as described.

CHARLES D. CURRY.

Witnesses:
JAMES SCANLON,
FRANZ KOHFELDT.